United States Patent Office 3,193,062
Patented July 6, 1965

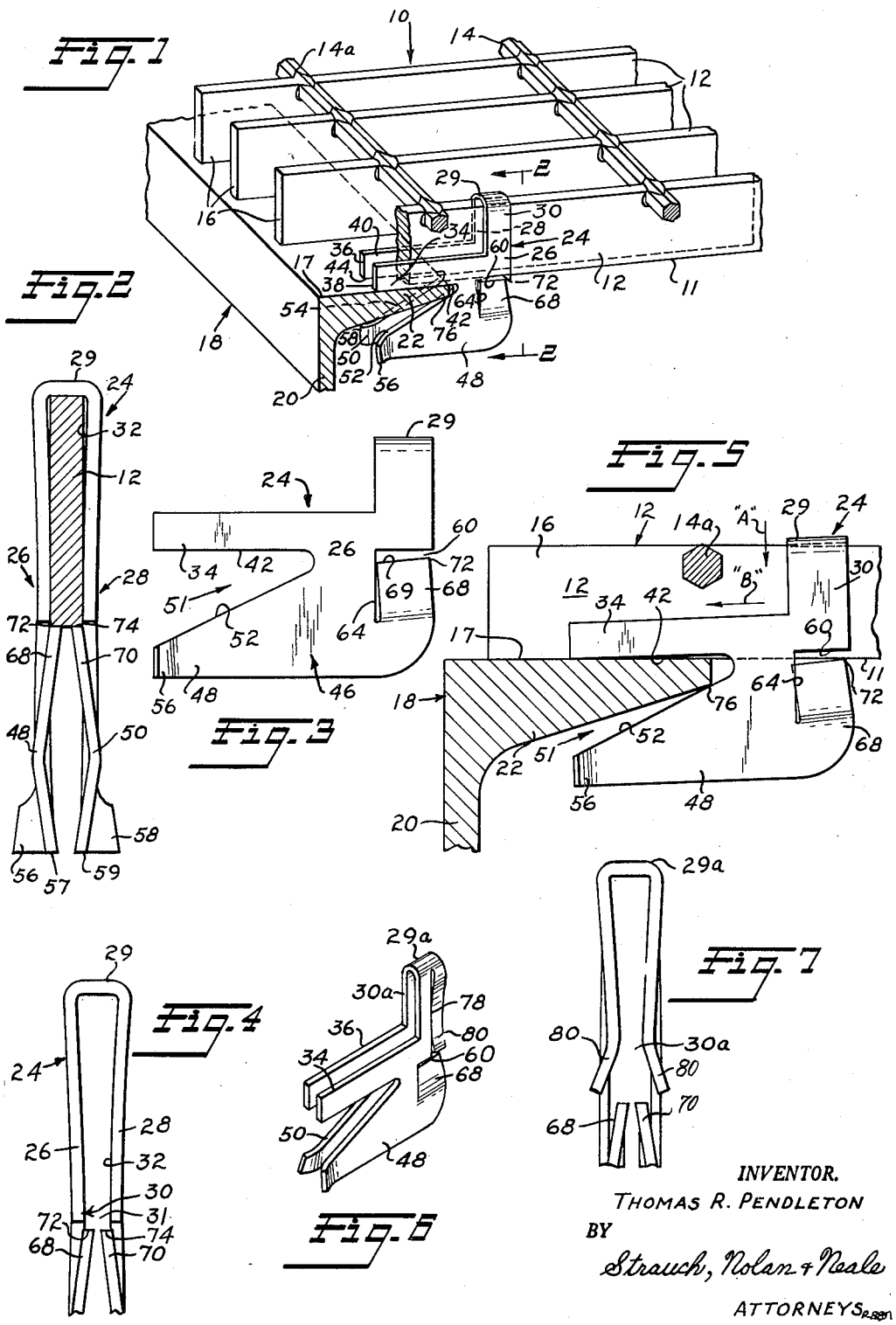

3,193,062
SELF LOCKING STRUCTURE FASTENER
Thomas R. Pendleton, Gary, Ind., assignor, by mesne assignments, to Rockwell-Standard Corporation, a corporation of Delaware
Filed Mar. 1, 1962, Ser. No. 176,710
18 Claims. (Cl. 189—35)

The present invention relates in general to fastening members for securing structure members together and more in particular to self locking fasteners or clips joining metal gratings to support members.

Metal gratings of various forms and shapes have come into widespread use in the industry and construction trade, for instance: industrial floors, catwalks, window guards, bridge floors, grilles, stair treads, etc. These metal grating structures usually comprise a number of panels of desirable size and shape fitted and attached together and mounted on suitable supports such as joists, sills and I-beams. Conventional methods of attaching the grating panels to supports have included various clamps or clips attached to both the support and the grating by bolts and nuts which in most cases had to be inserted and tightened from difficult to reach positions such as underneath the grating, because of the limited space available. In some instances, it was necessary to weld abutting ends of the grating structure and support together to provide a more rigid and shakeproof structure.

The foregoing attaching methods have been time consuming and costly and, in general, unpractical, and the present invention overcomes these disadvantages.

It is the major object of the present invention to provide a novel fastening clip for quickly and reliably attaching a metal grate structure to a support, eliminating the need for nuts and bolts, welded joints and the like.

Another object of the invention is to provide a novel grating mounting clip of generally U-shape adapted to fit over and lock on a grating bar and formed with a jaw for gripping a support.

Another object of the invention is the provision of a novel self locking grating mounting clip structure having spring arms that firmly lock in place.

Still another object is to provide a novel unitary self locking grating clip having a plurality of spring arms, two pairs of which are angularly disposed to each other to define a jaw structure adapted to firmly grip a support flange with a wedging action.

A further object of the invention is the provision of a novel self-locking grating mounting clip having spring biased tangs adapted to bite into the metal of a bar in the grating structure to prevent removal of displacement of the clip in one direction.

Other objects and novel features will become apparent from the following description in connection with the appended drawings in which:

FIGURE 1 is a perspective view showing, partly in section, a grating structure attached to a support by clips according to a preferred embodiment of the present invention;

FIGURE 2 is a cross section through a main bar of the grating structure substantially on line 2—2 of FIGURE 1 showing a rear view of the clip;

FIGURE 3 is a side elevation of the clip apart from assembly with the grating and support;

FIGURE 4 is an end elevation of the clip of FIGURE 3;

FIGURE 5 is an enlarged view mainly in section further illustrating clip in the assembly;

FIGURE 6 illustrates in perspective a further structural embodiment of the clip; and FIGURE 7 is an end view of the clip of FIGURE 6.

With reference to the drawings, there is illustrated one edge area of a rigid metal grating panel 10 which may be of any shape or size. Grating panel 10 comprises a number of rigid parallel rectangular cross-section metal main bars 12 intersected at regular intervals by a number of parallel metal cross bars 14 welded or otherwise permanently secured thereto. The metal of the grating is usually aluminum or a like light metal or alloy. In this assembled position, the projecting ends 16 of the main bars 12 of metal grate panel 10 are laid upon and supported from below on a flat surface 17 of a rigid stationary sill or joist 18 of channel, I-beam, L-beam or any other desired cross-section. The support 18 in this instance has a web 20 from which extends an upper flange 22 defining horizontal planar surface 17 on which the grating panel 10 rests.

Grating panel 10 is attached to support 18 in the present invention by the special clip 24. The clip 24 is stamped from a single sheet of metal, preferably stiff spring steel that will retain a given shape, usually about 3/64" thick. It comprises identical but opposed generally parallel sides 26 and 28 formed by folding the stamped sheet blank upon itself at its middle so that the sides 26 and 28 extend downwardly in side by side spaced relation from an integral bridge 29. As shown in FIGURE 2, the sides 26 and 28 are spaced apart by approximately the thickness of a bar 12. Thus, there is provided at the upper end of the clip a U-shaped loop section 30 providing a channel 32 which is adapted to receive one of the main bars 12 of the grating panel 10 with bridge 29 engaging the top edge of the bar as shown in FIGURES 1 and 2.

As shown in FIGURE 4, the spring arm sides of U-section 30 may incline inwardly toward its open mouth 31 so that when the clip is on the bar 12, as in FIGURE 2, the U-section 30 frictionally grips the bar 12.

Immediately adjacent U-section 30 parallel identical upper arms 34 and 36 project in the same lateral direction at right angles to the U-section 30 and substantially co-planar with the sides thereof, so that the inside surfaces 38 and 40 of the arms 34 and 36 respectively embrace and laterally extend along the flat vertical sides of main bar 12. Surfaces 38 and 40 are effectively smooth continuations of the inside surfaces of U-section 30.

The lower edges 42 and 44 of the arms 34 and 36 extend over the flat upper surface 17 of support flange 22. The space between arms 34 and 36 corresponds to the width of main bar 12, and the distance from the lower edges of these arms to the bridge 29 corresponds to the depth of main bar 12, so that arms 34 and 36 and U-section 30 snugly fit upon main bar 12. This is important to achieve a shakeproof and rigid assembly as will become apparent.

A clamping portion 46 of the clip extends integrally downwardly from adjacent the inner ends of arms 34 and 36 and forwardly in the same direction as arms 34 and 36. This comprises two identical substantially parallel lower arms 48 and 50 lying mainly substantially in the same planes as the corresponding arms 34 and 36 and the sides of the U-section 30. The upper edge surfaces 52 and 54 of lower arms 48 and 50 extend at a downwardly directed acute angle relative to the undersides 42 and 44 of said lower arms, to define a bifurcated wedge shaped jaw structure 51 into which extends the support flange 22 in the assembly of FIGURE 1.

The jaw angularity is such that clip 24 will become firmly wedged onto flange 22 of the support during assembly as will be explained. As shown in FIGURE 2, the lower leg ends 57 and 59 may be bowed toward each other slightly. The forward tips 56 and 58 of lower arms 48 and 50 are slightly flared outwardly as illustrated, to facilitate assembly of the clip on the main bar.

The rear ends of lower arms 48 and 50 directly underneath the U-section 30 are slitted horizontally longitudinally as at 60 and 62 at a level adjacent the undersides of upper arms 34 and 36, and the distance from the slits 60 and 62 to bridge 29 is preferably slightly less than the depth of main bar 12. Slits 60 and 62 intersect vertical leg slits 64 and 66 disposed at right angles thereto and substantially aligned with the forward vertical edge of U-section 30. These slits provide resilient spring tongues 68 and 70 which are bent toward each other inwardly of the clip sufficiently to lie underneath the lower edge 11 of main bar 12 when the clip is mounted as shown in FIGURES 2 and 5.

As shown in FIGURE 3, the upper end 69 of tongue 68 is slightly spaced vertically from the lower end of the U-section 30 and at its rear edge forms a sharp corner or edge 72 adapted in the assembly to bite into the metal of bar 12 as will appear. If desired the tongue end may incline slightly upwardly and rearwardly as shown in FIGURE 3 to accentuate this sharp edge. A similar sharp edge 74 is provided on tongue 70 in lateral alignment with edge 72.

It will be noted that preferably the parts are so proportioned that the inclined jaw plane containing surfaces 52 and 54, if extended, will pass through the intersections of the slits in the legs.

Thus the clip of the invention is a one-piece sheet metal generally U-shaped element having a central bridge 29 and generally parallel identical but opposed side members. The side members have a forwardly open wedge jaw structure formed by upper arms 34 and 36 and lower arms 48 and 50, and rearwardly disposed spring locking tongues 68 and 70. These tongues coact with bridge 29 to vertically locate a clip 24 on the main bar 12 of the grating structure, and the jaws wedgingly embrace support flange 22. With the clip mounted on the main bar 12 with the jaw structure 51 tightly gripping flange 22, and with the lower main bar edge resting flatly on upper flange surface 17, the sharp edges 72 and 74 of tongues 68 and 70 respectively bite into bar 12 and anchor the entire clip against displacement to the right in FIGURE 5. It will be understood that at the other end of bar 12 (not shown) a similar support and clip structure mounts the grating on a support, and there the clip is locked against movement to the left as viewed in FIGURE 5.

For assembly, after the grating is laid flat across the space between supports 18, a clip 24 is turned at 90° relative to the position shown in FIGURE 5, so that the flared mouth at 56, 58 faces downwardly and the clip may slide down on bar 12. The side members of the clip are spread during this action. As shown in FIGURE 5, the clip 24 is mounted adjacent but inwardly of the outermost crossbar 14a.

Spreading of the side members also spreads the upper arms 34 and 36 which also embrace the sides of bar 12. Then the clip is rocked, clockwise in FIGURES 1 and 5, so that upper arms 34 and 36 extend under the crossbar 14a, and slid downwardly and to the left in FIGURE 5 until bridge 29 engages the top of bar 12 and jaw 51 embraces flange 22. The dimensions of the clip 24 relative to bar 12 are preferably such that the vertical distance from tongue points 72 and 74 to bridge 29 is less than the vertical depth of bar 12 so that bar 12 is effectively vertically wedged between bridge 29 and the tongue points which bite into surface 11 lockingly.

It will be noted that as the clip 24 slides downwardly (in FIGURE 5) over bar 12 the tongues 68 and 70 will be cammed laterally outwardly, but as soon as the tongues pass below the bottom edge 11 of bar 12 they will spring inwardly to underlie surface 11 as shown in FIGURE 2.

Further pressure exerted on the clip 24 in a downward direction, indicated by arrow "A," and a forward direction, indicated by arrow "B," results in a slight counterclockwise rocking of the entire clip about the rounded inner flange edge 76 with the edges 52 and 54 of the lower arms 48 and 50 camming over the edge 76 which constitutes a fulcrum point. This causes the sharp tongue edges 72 and 74 to bite into the softer metal of bar 12 at undersurface 11 to thereby increasingly lock the clip against lateral displacement to the right in FIGURE 5.

Due to the resiliency of the arms of the clip and the angular disposition of the leg edges, the clip 24 is more firmly wedged over the flange 22 of the stationary support 18. The rear tongues 68 and 70 have now sprung underneath the main bar 12 as illustrated in FIGURE 2 and the points 72 and 74 positively bite into the metal of main bar 12 to securely hold the clip in the maximum leftward slightly cocked locking position of FIGURE 5 and prevent any accidental dislocation of the clip. The U-section 30 in conjunction with lower arms 48 and 50 ties main bar 12 tightly down against the flange 22. The bar 12 is similarly clipped to a support 18 at the other side from that shown in FIGURE 1.

In FIGURE 6 is illustrated a further embodiment of the clip in which the upper channel section 30a is slitted intermediate its ends at 78 from adjacent the bridge 29a to the horizontal slits 60 and 62 which they intersect so that a pair of rearwardly disposed spring arms 80 is provided which are reversely bent inwardly and outwardly at their lower ends as shown in FIGURE 7, thus providing a reduced dimension between opposite arms of U-section 30a. This structure of the clip is particularly convenient where it is desired to have the same clip adaptable to main bars of different widths. The spring arms 80 will apply sufficient holding pressure to the main bars through their spring action.

The present invention provides a novel fastening clip for securing metal gratings to supports which is relatively simple and inexpensive and may be stamped out of one piece of sheet metal and bent in a single operation. The clip can be mounted with simple tools and from the top of the grating, and no other fastening methods as bolts and screws are necessary. Due to its unique construction the clip is securely attached to the grating main bar with essentially a snap fastener action and provides a rigid connection to the support.

The present invention may be embodied in other specific forms without departing from the essential characteristic or spirit thereof, therefore, the present embodiments are being considered in all respects as illustrative only and not restrictive the cope of the present invention being indicated by the appended claims rather than by the present invention.

What is claimed and desired to be secured by Letters Patent is:

1. A generally U-shaped fastener for securing a rigid bar of a grating or like structure upon a relatively fixed support with an end of said bar overlying said support comprising a downwardly open channel adapted to be fitted over said bar with the channel sides frictionally engaging opposite sides of the bar, spring tongues integrally connected with the opposite channel sides and extending upwardly away from the lower end of said channel, the upper ends of said tongues being disposed laterally inwardly of the channel sides so as to engage the underside of said bar, and a plurality of arms integral with the channel sides and projecting away from one end of the channel to define a jaw structure fitting forcibly over an adjacent edge of said support, said tongues having sharp locking corners located near the other end of said channel and adapted to engage said underside of the bar to prevent displacement of said fastener along said bar away from said support.

2. The fastener defined in claim 1, wherein said fastener is a single sheet of stiff resilient metal such as spring steel.

3. The fastener defined in claim 1, wherein said arms comprise a pair of laterally aligned upper arms projecting from the lower ends of the channel frictionally engaging the sides of the bar and overlying the support, and a pair of laterally aligned lower arms extending angularly relative to the upper arms in underlying relation to said support, said arms defining a wedge shaped jaw structure to grip said support edge.

4. The fastener defined in claim 3, wherein the open ends of said lower arms are outwardly flared.

5. The fastener defined in claim 3, wherein said jaw arms and said tongues are so arranged that forcible displacement of said fastener along said bar produces rocking of the fastener about said support edge as a fulcrum to cause said tongue corners to bite into the underside of said bar.

6. The fastener defined in claim 1, comprising a bridge adapted to overlie the upper edge of said bar and forming the closed upper end of the channel, and similar but opposed side members extend in generally parallel relation from the bridge, each side member comprising one side of the channel, one of said tongues and a pair of said arms with the respective arms of each pair in lateral alignment to define a bifurcated jaw structure.

7. The fastener defined in claim 1, wherein said jaw defining arms comprise a pair of laterally aligned bar embracing upper arms extending from the opposite lower ends of the channel substantially parallel to the channel sides, and a pair of laterally aligned lower arms having their upper edges lying substantially in a plane that is inclined with respect to a plane containing the lower edges of said upper arms.

8. The fastener defined in claim 7, wherein the upper arms extend at substantially right angles to the respective channel sides.

9. The fastener defined in claim 7, wherein said channel sides and tongues are contained in integral sheet metal extensions from a relatively narrow bridge that is adapted to overlie the upper edge of said bar, and said tongues are formed by intersecting slits in said extensions below the channel sides.

10. The fastener defined in claim 9, wherein the plane containing the upper edges of said lower arms also extends substantially through the intersection of said slits.

11. The fastener defined in claim 9, wherein the intersection of said slits is substantially in alignment with the end of said channel that is adjacent said jaw structure.

12. The fastener defined in claim 1, wherein said channel comprises a bridge portion adapted to overlie the upper edge of said bar and depending spring biased side members frictionally gripping the opposite sides of said bar.

12. The fastener defined in claim 12, wherein said side members of the channel comprise integral spring arms that are oppositely biased toward each other and adapt the fastener to different bar widths.

14. A unitary U-shaped clip fabricated from a single blank of resilient sheet metal comprising a bridge and opposed similar side members extending in side by side relation from opposite sides of the bridge, said members defining with said bridge a channel, laterally flexible similar spring locking tongues on said members extending away from the open mouth of said channel with the free ends of said tongues terminating in adjacent spaced relation to the open mouth of said channel and being closer spaced laterally than the channel edges at the open mouth of said channel, and means on said members defining a jaw structure that opens away from and at substantially right angles to one end of said channel, said tongues having sharp corners disposed adjacent the other end of said channel.

15. The clip defined in claim 14, wherein said jaw structure comprises laterally aligned upper arms on the respective side members extending at substantially right angles from the channel and laterally aligned lower arms on the respective side members extending coextensively with said upper arms, and said tongues are formed on the respective side members with the edges of the free ends of said tongues lying substantially in a plane extending in the same direction as and adjacent the undersides of said upper arms.

16. An integral self-locking clip for mounting a grating upon a support comprising a grating bar embracing loop having each of its sides extended to provide a pair of locking spring tongues and a support engaging open jaw structure, said tongues having their free edges terminating adjacent and laterally inwardly of the lower edges of the loop sides, and said jaw being open at substantially right angles to the mouth of the loop defined by said lower edges of the loop sides.

17. A generally U-shaped fastener for securing a rigid bar of a grating or like structure upon a relatively fixed support with an end of said bar overlying said support, comprising a downwardly open channel adapted to be fitted over said bar with the channel sides frictionally engaging opposite sides of the bar, locking tongues integrally connected with the opposite channel sides, the upper ends of said tongues being disposed laterally inwardly of the open end of the channel so as to engage the underside of said bar beneath the channel, and a plurality of arms integral with the channel sides and projecting away from one end of the channel to define a jaw structure fitting forcibly over an adjacent edge of said support, said tongues having sharp locking corners located near the other end of said channel and adapted to engage said underside of the bar to prevent displacement of said fastener along said bar away from said support.

18. A unitary U-shaped clip fabricated from a blank of resilient sheet metal comprising a bridge and opposed essentially parallel side members extending away from said bridge, opposed locking tongues formed integrally with said side members at one edge thereof and extending inwardly of said side members, said locking tongues having locking formations disposed inwardly of said side members, and spring fingers at the opposite edge of said side members disposed essentially in the plane of said side members and extending essentially parallel to said bridge and defining a gripping jaw structure.

References Cited by the Examiner
UNITED STATES PATENTS
1,027,632   5/12   White _____ 50—315
FOREIGN PATENTS
573,581   11/45   Great Britain.
845,869   8/60    Great Britain.

RICHARD W. COOKE, JR., Primary Examiner.
JACOB L. NACKENOFF, Examiner.